United States Patent [19]

Lipscomb

[11] 3,950,303

[45] Apr. 13, 1976

[54] POLYOLEFIN/CHROMIUM MODIFIED MINERAL COMPOSITIONS AND PROCESS FOR THEIR PREPARATION

[75] Inventor: Robert DeWald Lipscomb, Wilmington, Del.

[73] Assignee: E. I. Du Pont de Nemours and Company, Wilmington, Del.

[22] Filed: Mar. 11, 1974

[21] Appl. No.: 449,987

[52] U.S. Cl. ......... 260/42.14; 252/428; 252/429 A; 252/429 C; 252/431 C; 260/42.16; 260/42.18; 260/42.22; 260/42.46; 260/42.53; 264/320; 264/331
[51] Int. Cl.$^2$..... C08K 9/00; C08K 9/04; C08J 3/20
[58] Field of Search........... 260/42.53, 42.14, 42.16; 252/428, 429 A, 429 C, 431 C

[56] References Cited
UNITED STATES PATENTS

| | | | |
|---|---|---|---|
| 3,256,236 | 6/1966 | Herman et al. | 260/42.53 |
| 3,297,466 | 1/1967 | Herman et al. | 117/47 R |

FOREIGN PATENTS OR APPLICATIONS

| | | |
|---|---|---|
| 2,130,677 | 12/1971 | Germany |

OTHER PUBLICATIONS

Chemical Abstracts, Vol. 76, 1972, 114154c.

*Primary Examiner*—James H. Derrington

[57] ABSTRACT

Described is a process for preparing polyolefin/inorganic filler compositions in which
a. an inorganic filler is contacted with a solution of a chromium(III) compound whereby the chromium compound is adsorbed onto the surface of the filler,
b. the chromium-modified filler is activated by drying,
c. the filler is dispersed as a slurry in an inert, liquid hydrocarbon,
d. an organoaluminum compound is added to the slurry,
e. olefin is polymerized in the slurry, and
f. the resulting filler having olefin polymerized thereon is isolated as a free-flowing, essentially homogeneous powder.

6 Claims, No Drawings

POLYOLEFIN/CHROMIUM MODIFIED MINERAL COMPOSITIONS AND PROCESS FOR THEIR PREPARATION

BACKGROUND OF THE INVENTION

1. Field of the Invention

This invention relates to a process for polymerizing olefins onto a chromium-modified filler in the presence of an organoaluminum compound, and to the novel polyolefin/filler compositions obtained thereby.

2. Description of the Prior Art

The utility of organic polymers has been broadened in recent years to the degree that rigid polymers such as the nylons, ABS (acrylonitrile/butadiene/styrene) and polyacetal resins have begun to replace the more conventional metal, wood and ceramic materials. The lower cost of polyolefins such as polyethylene could make them candidates for a wider range of applications if certain properties such as heat distortion temperature, stiffness and hardness could be improved.

Much research has been directed toward methods of improving those properties mostly by filling polyolefins with finely divided solids or fibrous fillers. One method of providing filled polyolefins is by melt mixing the polyolefin with the filler. This procedure, however, requires that the polyolefin be of relatively low molecular weight, that is, have an inherent viscosity of less than about 1. While the resulting products generally have increased stiffness, they suffer from the disadvantage of lower elongation and increased brittleness. Serious problems of compounding these polymers are also encountered including the large power requirements for mixing machinery, degradation of polymers by heating, nonuniformity of filler dispersion, and poor adhesion of polymer to filler, even when "coupling compounds" are employed.

Various attempts have been made to decrease these problems by preparing filled polyolefins without compounding the polyolefin and the filler; the most widely used method being polymerization of the olefin in the presence of selected fillers. One suggested method of effecting olefin polymerization on the filler is with coordination catalysts. These well-known catalysts are combinations of halides or esters of titanium or another transition metal including chromium and a reducing compound such as an organoaluminum compound or, more broadly, an organometallic compound of a metal of Group I, II or III of the Periodic Table. This method in general, however, has not provided toughness in highly filled polyolefin compositions.

Specific prior art pertinent to the present invention includes the following:

1. R. J. McManimie, U.S. Pat. No. 3,578,629, prepares filled polyolefins by low pressure polymerization of an α-monoolefin in the presence of a coordination catalyst and an inorganic filler previously reacted with an organosilane "coupler" compound. A wide range of inorganic fillers is mentioned including kaolinite, attapulgite and bentonite.

2. D. F. Herman et al., U.S. Pat. No. 3,297,466, disclose a continuous process for treating material such as particles of cellulose, silicates, asbestos and other particulate materials with a multicomponent catalyst system, following which the treated material can be mixed with a polymerizable monomer and polymerization effected. The resulting product is 90 to 95% polymer uniformly deposited over the particulate material. The components of the catalyst system are chosen from an organometallic compound such as an alkyl or aryl derivative of lithium, sodium, potassium, magnesium, calcium, zinc, cadmium, boron or aluminum, and a transition metal compound such as a halide or ester of titanium, zirconium, vanadium or chromium.

3. G. G. McClaflin et al. U.S. Pat. No. 3,466,242, disclose the coating of various finely divided solids such as silica flour, fullers earth and sand with 2 to 20% of a polymer obtained by polymerizing a 1-olefin such as ethylene in the presence of the solids which have been treated with a catalytic material, for example, triethylaluminum and titanium tetrachloride. It is stated that compounds of the heavier metals of Group IV-B, V-B or VI-B of the Mendeleev period system of elements can be used with the alkylaluminum compound.

SUMMARY OF THE INVENTION

The present invention provides an essentially homogeneous, polyolefin/inorganic filler composition which can be molded to form articles of superior toughness, stiffness and hardness without any further compounding with bulk polyolefin. The composition comprises a. polyolefin having an inherent viscosity of at least about 2.5 selected from the group consisting of homopolymers of $(C_2-C_{10})$-1-alkenes and copolymers of $(C_2-C_{10})$-1-alkenes with each other polymerized onto b. about 20–70% by weight, based on the total composition, of particulate inorganic filler having a surface area of less than about 100 $m^2$/g and an average effective particle diameter of less than about 50 $\mu$ which has been pretreated to contain about 0.01 to 1% by weight, based on the filler, of chromium adsorbed onto the surface of the filler, and then activated by drying. This invention is also directed to the process for preparing these products which comprises a. contacting particulate inorganic filler having a surface area of less than about 100 $m^2$/g and an average effective particle diameter of less than about 50 $\mu$ with a solution of chromium(III) compound whereby the chromium compound is adsorbed onto the surface of the filler in the amount of about 0.01 to 1% by weight of chromium, based on the filler;

b. activating the chromium-modified filler by drying at a temperature of about 25° to 400° C.;

c. dispersing at least about 1 weight/volume percent of the resulting chromium-modified filler as a slurry in an inert, liquid hydrocarbon;

d. adding to the slurry about 0.01 to 2% by weight, based on the filler, of organoaluminum compound selected from the group consisting of trialkylaluminums, dialkylaluminum hydrides, dialkylaluminum alkoxides, alkylaluminum halides and polymeric hydrocarbylaluminums in which the alkyl groups, alike or different, have 1 to 10 carbons each;

e. polymerizing olefin selected from the group consisting of $(C_2-C_{10})$-1-alkenes and mixtures thereof in the presence of the slurry with agitation at a temperature of about 0° to 250° C. and a pressure from atmospheric to about 500 atmospheres to form a polyolefin having an inherent viscosity of at least about 2.5; and f. isolating the resulting polyolefin/filler composition as a free-flowing, essentially homogeneous powder.

DETAILED DESCRIPTION OF THE INVENTION

In accordance with this invention highly filled polyolefin compositions are prepared by an overall process in which a finely divided inorganic filler is treated with a chromium (III) compound and activated, polymerization is effected onto the filler in the presence of an organoaluminum compound, and an essentially homogeneous, filled polyolefin composition is recovered. These compositions can be formed into objects which have a good combination of stiffness, toughness and hardness.

Unlike the filled polyolefins which have been previously reported, the filled polyolefin compositions of this invention provide formed objects which are not brittle, but retain the good elongation, impact resistance and electrical properties such as volume resistivity characteristic of unfilled polyolefins. Moreover, objects formed from the filled polyolefin compositions of this invention exhibit a range of properties including improved modulus, higher hardness, lower creep, higher heat distortion temperature, and lower cost as compared with unfilled polyolefins which suggest a value-in-use not previously realizable.

A wide variety of finely divided, inorganic fillers may be used in accordance with this invention. Suitable fillers are minerals including alumina hydrates such as alumina trihydrate and the like; heavy metal phosphates and sulfates such as gypsum ($CaSO_4 \cdot 2H_2O$) and barium sulfate; silicas ($SiO_2$) such as diatomaceous earth, pumice and kieselguhr; titanias such as rutile and anatase; other metal oxides such as zinc oxide, magnesium oxide, and iron oxide; essentially water insoluble silicates; and other minerals such as graphite, and molybdenite ($MoS_2$). Less preferred minerals such as the basic metal carbonates and oxides may be used to advantage in admixture with preferred minerals such as clay, talc and other silicates. Other suitable inorganic fillers include metal powders, synthetic silicas, synthetic carbonates, and glass powder and fibers.

By "essentially water insoluble silicates" is meant silicates which are either completely insoluble or so close to being completely insoluble that the small amount of solubility does not prevent the advantages of this invention from being realized. Typical essentially water insoluble silicates include calcium silicates ($CaSiO_3$) such as wollastonite; magnesium silicates such as talc; magnesium calcium aluminum silicates $[(Mg \cdot Ca)O \cdot Al_2O_3 \cdot 5SiO_2 \cdot nH_2O]$ such as montmorillonite and serpentine; lithium aluminum silicates such as spodumene $[(Li,Na)_2Al_2Si_4O_{12}]$; potassium aluminum silicates such as feldspar ($K_2O \cdot Al_2O_3 \cdot 6SiO_2$) and mica ($K_2O \cdot 3Al_2O_3 \cdot 6SiO_2 \cdot 2H_2O$); magnesium iron silicates such as olivine $[(Mg,Fe)_2SiO_4]$; and aluminum silicate clays ($Al_2O_3 \cdot xSiO_2 \cdot nH_2O$) where $x$ is 1 to 5 and $n$ is 0 to 4. Synthetic silicates such as "Silene" L, a precipitated, hydrated calcium silicate, can also be used.

Suitable examples of alumina trihydrates are the following products sold by Aluminum Company of America:

C-30BF, 15–25% on 325 mesh;
C-333, 99% through 325 mesh
94–99% less than 30 $\mu$
85–93% less than 20 $\mu$
56–67% less than 10 $\mu$
20–40% less than 5 $\mu$
"Hydral" 710, average 1 $\mu$; and
C-33, 40–70% through 325 mesh.

Suitable clays include kaolinite, attapulgite, fuller's earth, bentonite and mullite. The preferred clays are kaolins such as Georgia Kaolin Company's "Hydrite" MP, average particle size 9.5 $\mu$, range 1.5–35 $\mu$; Engelhard Minerals Company's "ASP" 400, average particle size 4.8 $\mu$, range 0.7–20 $\mu$; Engelhard's ASP 100, average particle size 0.55 $\mu$, range 0.4–4 $\mu$; Engelhard's "Satintone"-1; Harwick Standard Chemical Company's "Harwick" GK, 53% particle size less than 2 $\mu$; "Harwick" 50-R, average particle size 0.55 $\mu$; and the like.

The fillers used in accordance with this invention should have a surface area of less than about 100 $m^2/g$. In other words, they should not be too finely divided. If the surface area is too great, then homogeneous compositions will not be formed. Preferably the surface area is less than about 50 $m^2/g$. The filler particles should have an average effective diameter of less than about 50 $\mu$. If the particles are larger than about 50 $\mu$, then the improvement in modulus of the polyolefin will be impaired. Preferably the particles have average effective diameters of less than about 10 $\mu$.

The filler must be pretreated by first contacting it with a soluble chromium (III) compound, and then activating the chromium-modified filler in order to achieve the novel results of this invention. The filler is contacted with a solution of a chromium (III) compound whereby the chromium compound is adsorbed onto the surface of the filler in the amount of about 0.01 to 1% by weight of chromium based on the filler. The solvent used to prepare this solution may be water or any organic liquid in which the chromium (III) compound is soluble. A preferred class of organic solvents includes polar solvents such as alcohols and especially alkanols such as methanol. Contacting the filler with the chromium compound is believed to result in the bonding of a chromium species to the filler.

The chromium compounds used in treating the filler may be any soluble chromium (III) compound. These are generally water-soluble, but organic solvent soluble complex chromium compounds also find use in this invention. The initially soluble chromium compounds are no longer soluble after being adsorbed by the filler.

Exemplary chromium compounds include chromium nitrate; chromium halides such as chromium fluoride, chloride, bromide and iodide; $C_1$ to $C_{12}$ esters of chromium such as chromium acetate, chromium oxalate, chromium octoate and chromium naphthenate; chromium sulfate; $[Cr(NH_3)_5Cl]Cl_2$; $[Cr(NH_3)_6]Cl_3$; hexaurea chromium (III) fluosilicates $[Cr(CON_2H_4)_6]_2 \cdot (SiF_6)_3 \cdot 3H_2O$; fumarotochromium (III) nitrates; methacrylatochromium hydroxide; methacrylatochromium chloride; and the like; and mixtures thereof. The chromium compound is preferably chlorine-free.

The chromium-modified filler is activated by drying at a temperature of about 25° to 400° C., preferably about 150° to 250° C., and most preferably about 175° to 200° C. At temperatures below the boiling point of the solvent being removed, the drying process may be assisted by use of vacuum. Although it is not understood exactly what takes place during this activation step, it is believed that more than a simple drying is involved. The terms "dry" and "drying", when used throughout the specification and claims in reference to the filler, means dry to the extent that residual liquid no longer adversely effects polymerization.

Before the chromium-modified filler can be used in the polymerization reaction, it must also be freed of gaseous oxygen, water and other polar impurities that interfere with the polymerization reaction. This is readily accomplished by sweeping the filler with an inert atmosphere such as nitrogen.

Polymerization of the olefin onto the filler is carried out by:

1. dispersing at least about 1 weight/volume percent, and preferably at least about 5 weight/volume percent, of chromium-modified filler as a slurry in a dried, deoxygenated, liquid hydrocarbon;
2. adding to the slurry about 0.01 to 2% by weight, based on the filler, of organoaluminum compound selected from the group consisting of trialkylaluminums ($R^1R^2R^3Al$), dialkylaluminum hydrides ($R^1R^2AlH$), dialkylaluminum alkoxides ($R^1R^2AlOR^3$), alkylaluminum halides ($R^1R^2AlX$ and $R^1AlX_2$) and polymeric hydrocarbylaluminums in which the alkyl groups, alike or different, contain 1–10 carbon atoms, and stirring under an inert atmosphere until the viscosity is reduced and essentially no agglomerated filler remains;
3. polymerizing olefin selected from the group consisting of ($C_2$–$C_{10}$)-1-alkenes and mixtures thereof under an inert atmosphere in a pressure-resistant reactor in the presence of the slurry with agitation at pressures from atmospheric to about 500 atmospheres and at temperatures from about 0° to 250° C. for about 1 minute to 24 hours to form a polyolefin having an inherent viscosity of at least about 2.5; and
4. isolating the resulting polyolefin/filler composition as a free-flowing, essentially homogeneous powder by means of conventional steps such as filtering, washing and drying. By the term "essentially homogeneous" it is meant that each particle contains essentially the same weight percent of polyolefin.

The diluents useful to form slurries for polymerization are anhydrous hydrocarbons which are preferably made so by passing through highly absorptive alumina such as a Woelm acid alumina column immediately prior to use. While the liquid, cyclic and acyclic hydrocarbons of 5 to 10 carbon atoms such as pentane, hexane, heptane, octane, decane; cyclohexane, benzene, toluene, xylene and tetralin are preferred, the lower boiling propanes and butanes can also be used. The liquid diluents are often freed of contaminants such as $O_2$ and $H_2O$ by treatment with traces, e.g., about 0.05%, based on the weight of diluent, of the organoaluminum compound to be used as a catalyst component in the polymerization. This, along with the acid alumina treatment, ensures maximum avoidance of moisture and other impurities.

Suitable organoaluminum compounds usable in the polymerization include any of the trialkylaluminums, dialkylaluminum hydrides, dialkylaluminum alkoxides, alkylaluminum halides and polymeric hydrocarbylaluminums. Suitable compounds include the commercially available trimethylaluminum, triethylaluminum, tri-n-propylaluminum, triisobutylaluminum, tri-n-hexylaluminum, tri-n-octylaluminum, tri-n-decylaluminum, diethylaluminum hydride, diisobutylaluminum hydride, diethylaluminum ethoxide, diisobutylaluminum ethoxide, and the like. Polymeric hydrocarbylaluminums such as isoprenylaluminum are described in U.S. Pat. No. 3,149,136. The trialkylaluminums and dialkylaluminum hydrides are preferred. The alkylaluminum halides are not preferred since the final polymer is corrosive to metal in many applications. Preferably the compositions of this invention are essentially free of residual halogen and thus noncorrosive.

Slurries of the filler in the hydrocarbon can initially be quite viscous, especially in the case of high solids slurries. Addition of the organoaluminum compound to these slurries with vigorous stirring, such as in a high-speed blender, dramatically reduces the viscosity. For example, the viscosity of a typical system might be reduced from about 2,000 to 7,000 cp to about 100 to 500 cp. The combination of organoaluminum compound and vigorous stirring also results in a fine grained, free-flowing dispersion.

Due to the effect of the organoaluminum compound, the compositions prepared in accordance with this invention are essentially static free. By "static free" it is meant that the powder compositions flow freely through a glass funnel having an inside stem diameter of 1 centimeter.

The novel, low viscosity, polymerization medium of this invention comprises a dispersion containing a. at least about 1 weight/volume percent of particulate inorganic filler having a surface area of less than 100 $m^2/g$ and an average effective particle diameter of less than about 50 $\mu$ which has been pretreated to contain 0.01 to 1% by weight, based on the filler, of chromium adsorbed onto the surface of the filler, and then activated by drying, b. a deoxygenated, dry, inert, liquid hydrocarbon, and c. about 0.01 to 2% by weight, based on the filler, of organoaluminum compound selected from the group consisting of trialkylaluminums, dialkylaluminum hydrides, dialkylaluminum alkoxides, alkylaluminum halides and polymeric hydrocarbylaluminums in which the alkyl groups, alike or different, have 1 to 10 carbons each.

The polymerization reaction is carried out by contacting the dispersion of chromium-modified filler and organoaluminum compound with olefin selected from the group consisting of ($C_2$–$C_{10}$)-1-alkenes and mixtures thereof. Polyolefins which may be made include homopolymers of ($C_2$–$C_{10}$)-1-alkenes and copolymers of ($C_2$–$C_{10}$)-1-alkenes with each other. Suitable monomers include ethylene, propylene, 1-butene, 1-pentene, 4-methyl-1-pentene, 1-hexane, 1-octene, 1-decene, and mixtures thereof. Particularly preferred are polyethylene, polypropylene and copolymers of ethylene with up to about 15% by weight of one or more ($C_3$–$C_{10}$)-1-alkene. Other monomers known to be reactive in coordination polymerization reactions, for example, linear, nonconjugated diolefins such as 1,4-hexadiene, 1,6-octadiene, dicyclopentadiene, norbornene and norbornene derivatives such as ethylidenenorbornene, may also be added in small amounts.

One of the important advantages of this invention is that it provides highly filled polyolefin compositions containing relatively high molecular weight polyolefin. The polyolefin should have an inherent viscosity of at least about 2.5 and preferably at least about 4. The inherent viscosities referred to throughout the specification and claims are determined, except where otherwise specified, by measuring the viscosity of a 0.1 weight/volume percent solution of polyolefin in tetralin containing 0.1 weight/volume percent of butylated hydroxytoluene at 125° C. as described by Billmeyer in Textbook of Polymer Chemistry, Interscience Publishers (1957) at page 128. The term "weight/volume percent", as used throughout the specification and claims, refers to grams of solid added to 100 cubic centimeters of liquid.

The polymerization reaction may be carried out at temperatures of about 0° to 250° C. Polymerization temperatures below that at which the diluent swells the polyolefin are preferred since swelling greatly increases the viscosity of the reaction mixture and makes agitation difficult or impossible unless low concentrations of materials are used. For practical reasons, polymerizations should be run at temperatures not in excess of about 100° C when pure alkanes are used. When a strong polyolefin solvent such as benzene, toluene, tetralin or xylene is used, even lower temperatures, such as at about 50° C. or below, should be used. Preferably temperatures of about 25° to 100° C. are used, and most preferably about 50° to 90° C.

Polymerization is readily carried out at pressures from atmospheric to about 500 atmospheres. Pressures in the lower range are generally preferred, and about 3 to 100 atmospheres are most satisfactory. The course of the polymerization reaction is followed by noting the change in weight of the supply vessel containing the olefin. The supply vessel is normally used to maintain the pressure in the reaction vessel. Reaction times of about 1 minute to about 24 hours may be employed.

When combinations of different particulate fillers are used, intimate mixing of the fillers is critical to provide finely divided, uniform compositions. Agitation during polymerization controls both particle size and uniformity of composition. Strong agitation, as achieved with very rapid stirring, gives a fine-grained, free-flowing product. This is best achieved by use of an autoclave equipped with an efficient stirrer such as one having magnetic drive.

In one modification of the invention the polymerization reaction is carried out in the presence of small to moderate amounts of hydrogen. This results in products having enhanced modulus and lower elongation and impact strength. It is believed that the hydrogen acts as a chain transfer agent since the products obtained in the presence of hydrogen tend to be lower in molecular weight. This modification is of particular advantage in the preparation of films from the compositions of this invention since orientation of films is obtained more readily in the case of these slightly lower molecular weight polymers.

Photomicrographs of the compositions of this invention show that the polyolefin coats the filler particles. However, the polyolefin does not completely encapsulate the particles as evidenced by surface analysis of the composites by electron induced emission spectroscopy which indicates that both polymer and filler are present at the surface. The deposited polyolefin is believed to be intimately bonded to the filler by van der Waals and London dispersion forces. The compositions of this invention, consequently, run no danger of mechanical separation into their components during mechanical operations.

The compositions of this invention should contain about 30–80% by weight of polyolefin and about 20–70% by weight of particulate filler. At least about 30% polyolefin is necessary to provide sufficient binder to form tough molded objects. The advantages of this invention are obtained when the composition contains at least about 20% of particulate filler. Preferably the composition contains about 30–65% filler.

A wide variety of additives can be readily blended with the polyolefin/filler composition powders of this invention without the necessity of melting the polymer. For example, the compositions can be stabilized against ultraviolet and thermal oxidative exposure by the addition of conventional stabilizers and antioxidants. Suitable ultraviolet light absorbers include substituted benzophenones such as 2-hydroxy-4-n-heptoxybenzophenone, benzotriazoles such as substituted hydroxybenzotriazoles, salicylates such as phenyl salicylate, metal chelates such as "Cyasorb" UV 1084 and "Cyasorb" UV 2548, and carbon black.

Suitable antioxidants for addition to the compositions of this invention include alkylated phenols and bisphenols such as butylated hydroxytoluene, "Goodrite" 3114; alkylidene bis-, tris-, and polyphenols such as "Irganox" 1010 and "Santowhite" powder; thio and dithio bis-, tris-, and polyalkylated phenols such as "Santonox"; phenol condensation products such as "Toponol" CA: amines such as "Carstab" 601; esters such as dilauryl thiodipropionate; and organic phosphites and phosphates such as dodecyl phosphite and tris(nonylphenyl) phosphites. Fire retardants such as chlorinated polyethylene, zinc phosphates and tris-2,3-dibromopropyl phosphate can also be added.

The compositions of this invention can also be formulated with conventional organic and inorganic pigments to provide colored systems. Suitable pigments include quinacridone red, anthraquinone red, diarylide yellow-HR, bis-azo red, bis-azo orange, bis-azo yellow, isoindolinone orange, isoindolinone yellow, isoindolinone red, phthalocyanine blue, phthalocyanine green, carbon black, iron oxide, ultramarine blue, ultramarine green, titania, zinc oxide, antimony oxide and the like.

The free-flowing powder obtained from the polymerization reaction is readily formed into articles by various combinations of heat and pressure. In some cases the articles may be formed by simultaneously applying heat and pressure. In other cases articles are formed by first pressing and then heating. In still other cases, articles may be formed by first heating and then pressing. Moderate temperatures in the range of about 125°–210° C. and positive pressures in the range of about 10 psi to 25,000 psi or more are suitable for these operations. The temperatures selected in any specific case will depend on the particular filler used. For example compositions containing alumina trihydrate are preferably not processed above 200° C. Generally temperatures of about 150° to 225° C. are preferred.

A useful means of forming articles from these polyolefin/filler compositions is by simultaneously applying heat and pressure. For example, compression molding operations can be carried out by filling a mold with the composition powder, and pressing the powder in the mold with application of heat. Temperatures of about 150°–225° C. and positive pressures of about 10–500 psi are suitable. When the formed article has cooled, the mold is opened and the article is removed.

Sheets may be formed from these polyolefin/filler compositions by compression molding the powder in sheeting equipment such as continuous vulcanization equipment. In this operation polyolefin/filler powder is placed on a continuous belt which passes between shear-free compression rolls. The powder is heated to a temperature of about 150° C. to 225° C. while it is compressed through a set of shear-free compression rolls at a pressure of about 10 to 500 psi and the resulting sheet is removed from the continuous belt. The composition can be heated in any suitable manner such as by passing the belt containing the composition through a heating zone prior to passing through the compression rolls or by use of a heated compression roll.

Another method of forming articles from these compositions is by first applying heat and then applying pressure. For example, formed objects of a wide range of shapes can be prepared by first heating a piece of a sheet formed by compression molding in sheeting equipment as described above, and then pressing the hot sheet between a male die and a pad of elastomeric material. The temperature to which the sheet is heated can vary from about 150° to 225° C. The male die can be made of any solid material such as metal, wood, resin, and the like. Suitable elastomeric materials include silicone rubber, urethane rubber, and the like. The elastomeric pad can be of any suitable thickness, for example, it can be a block of elastomeric material having rigid backing. The hot sheet is allowed to cool as it is pressed between the die and the pad, and thus can be removed from the die almost immediately. In some cases it is desirable to subject the die to internal cooling.

The reforming of these compression molded sheets can also be carried out by controlled hydraulic forming in which the elastomeric pad is a rubber diaphragm backed by a hydraulic fluid. This reforming can also be carried out by hot or cold matched metal mold forming, that is, pressing or stamping the sheet between male and female metal dies.

The combination of physical properties of these compositions also results in their being tractable to powder technology, i.e., the compositions of this invention are obtained in fine powder form that can be placed in a mold and compressed at a positive pressure of at least about 100 psi and a temperature below the melting point of the polymer to form self-supporting articles. The article is then removed from the mold and densified by heating at a temperature above the melting point of the polymer, e.g., 105° to 225° C., to form the finished article.

The compositions of this invention can also be formed into films. These films may be obtained by stretching a sheet or film formed by any of the above compression molding techniques, such as continuous vulcanization or pressing between platens and heating. Before stretching, the sheet or film should be heated to a temperature in the range from about 10° C. below the normal melting point of the polyolefin to above the normal melting point of the polyolefin. The sheet or film may be stretched either in one direction or in more than one direction either sequentially or simultaneously. The degree of voids developed during stretching will vary depending on the stretching technique used.

In the case of pull stretching, an opaque, paper-like film having an increased degree of voids is obtained. This technique in many cases increases the strength of the film. Stretching by rolling the sheet or film under pressure results in a film which is stronger than the original and has a relatively lower void content than a similar film formed by pull stretching. In this rolling technique, temperatures above or below the normal melting temperature of the polyolefin may be used. The lower molecular weight materials, due to their lower viscosity, pull stretch more readily and are preferred in this operation.

Formed articles prepared from the compositions of this invention are characterized by high extensibility, impact toughness, and stiffness, along with good water repellence and noncorrosivity toward metals. The formed compositions of this invention retain a useful range of the extensibility and formability characteristic of polyolefins, while increasing the modulus and heat distortion temperature to the extent of providing stiff, tough, rigid articles.

EXAMPLES OF THE INVENTION

The following examples, illustrating the novel compositions of the invention, are given without any intention that the invention be limited thereto. In these examples, the organoaluminum compounds were added as a dilute solution in a hydrocarbon solvent. All percentages are by weight unless otherwise specified. Temperatures are in degrees centigrade unless otherwise specified.

For the tensile strength data, test bars of Type I and Type V of ASTM test method 638-44T were used. The physical properties were determined by the following ASTM test designations.

| Property | ASTM test |
| --- | --- |
| Tensile (T) | D-638-sec 10 |
| Elongation at break ($E_b$) | D-638-sec 10 |
| Modulus in tension ($M_t$) | D-638-sec 10 |
| Izod impact | D-256 |
| Heat distortion temperature (HDT) | D-648 |

Tensile strength is defined in accordance with the equation:

$$T = \frac{\text{highest load carried}}{\text{original cross section area}}$$

EXAMPLE 1

Part A

Kaolin ("Harwick" GK soft) was calcined at 600° to remove essentially all water of hydration, then cooled and 1000 g were made into a slurry with 1100 ml of distilled water containing 1.24 g of chromium (III) acetate monohydrate. The slurry was tumbled in a rod mill for 24 hours. The pH remained essentially constant at 5.5–6. Finally, the solid was isolated, and the aqueous solution was noted to be lighter in color than the original solution. The treated mineral was dried at 180° in a stream of nitrogen.

Part B

A 1-gal autoclave was dried at 150° under nitrogen purge and charged under nitrogen purge with 1000 ml of dried cyclohexane and 2 ml of a 1.6 molar solution of triethylaluminum. Next, a slurry was added, comprising 180 g of the treated kaolin clay (prepared as in Part A) and 800 g of dried heptane containing 4 ml of a 1.6 molar solution of triethylaluminum. The autoclave was closed and heated to 60°. The polymerization was carried out under 150 psi ethylene pressure during 2.16 hours. The product, 370 parts, was isolated after rinsing with methanol and drying, as a fine white powder that contained 49 weight percent clay.

A sample of the above composite was compression-molded at 175° into test bars that had the following tensile properties: strength, 3300 psi; elongation, 500%; modulus, 433,000 psi; and impact strength (Izod, 73° F), 15 ft lb/in notch.

EXAMPLE 2

This example shows the use of dehydrated kaolin and $Cr(OAc)_3$ at low polymerization temperature.

Part A

A slurry was made from 1000 g of kaolin ("Satintone"-1, Engelhard Industries) and 1.2 liters of a solution containing 1.24 g of chromium (III) acetate monohydrate. The slurry was mixed in a rod mill for 20 hours, then 30 ml of a 1% ammonium hydroxide solution was added to raise the pH of the slurry to 5. After a total of 50 hours in the mill, the slurry was filtered to isolate the solid. The aqueous solution was noted to be lighter in color than the original chromium (III) acetate solution. The collected solid was washed with 400 ml of acetone and dried at 170°–190° in a stream of nitrogen.

Part B

A 1-gal autoclave was dried at 150° under nitrogen purge and charged under nitrogen purge with 0.35 gal of dried cyclohexane and 2 ml of a 1.6 molar solution of triethylaluminum in hexane. To this was added a slurry comprising 159 g of kaolin, prepared as in Part A, 750 ml of dried heptane and 4 ml of a 1.6 molar solution of triethylaluminum in hexane. The autoclave was closed and the polymerization was carried out during 3 hours and 50 minutes at 35° under 100 psig ethylene pressure.

The product (334 g), isolated as a fine white powder after rinsing with methanol and drying, contained 47.5% by weight of clay.

Bars, compression-molded at 175° and 1500-2000 psi, had the following tensile properties: strength, 3232 psi, elongation, 346%, modulus, 577,000 psi and an impact strength (Izod, 73° F) of 14.8 ft lb/in of notch.

EXAMPLE 3

This examples shows the use of methacrylatochromium chloride as source of chromium (III) with kaolin.

Part A

A solution of 8 ml of Volan-L [E. I. du Pont de Nemours and Company, 6% Cr (III) as methacrylatochromium chloride, special low chloride composition] in 1100 ml. of distilled water was prepared and to this was added 5 ml of 1% ammonium hydroxide solution to raise the pH to about 4.5. This was next added to 1000 g of kaolin (Engelhard Industries, "Satintone"-1) and the resultant slurry was mixed in a rod mill for 2 hours. After this interval, another 90 ml of distilled water containing 10 ml of 1% ammonium hydroxide solution was added and the mixing continued for 36 hours. The solid was collected, washed with 400 ml of acetone and dried at 190°–200° in a stream of nitrogen.

Part B

A 1-gal autoclave was dried at 150° under nitrogen, cooled and charged under nitrogen purge with 0.4 gal of dried cyclohexane and 2 ml of a 1.6 molar solution of triethylaluminum in hexane. To this was added a slurry of 185 g of "Satintone"-1 (Engelhard Industries) kaolin (prepared as in Part A) in 750 ml of dried heptane containing 5 ml of a 1.6 molar solution of triethylaluminum in hexane. The autoclave was closed and the polymerization was carried out during 2 hours and 33 minutes at 60° and under 150 psig ethylene pressure.

The product (368 g) was isolated as a fine, white powder, after washing with methanol and drying. It contained 50% by weight clay, yet it could be readily compression-molded at 175° and 1500 psi into bars that had the following physical properties: tensile strength, 3480 psi; elongation, 483%; modulus, 486,500 psi, and impact strength (Izod, 73° F), 9.5 ft lb/in of notch.

EXAMPLE 4

This example illustrates the use of chromium (III) nitrate on a mixture of clay and $TiO_2$ pigment.

Part A

A solution of 2.0 g of chromium (III) nitrate monohydrate in 1 liter of distilled water was used to prepare a slurry with a mixture of 950 g of kaolin (Engelhard Industries, "Satintone"-1) and 50 g of titanium dioxide (Du Pont R 101 TiPure pigment). The slurry was mixed in a rod mill for 24 hours, then 5 ml of a 1N sodium bicarbonate solution was added to raise the pH to 5. Subsequently, the slurry was filtered and the collected solid was washed with 475 ml of acetone and dried in a stream of nitrogen at 150°–160° for 72 hours.

Part B

A 1-gal autoclave was dried at 150° under nitrogen purge, cooled and charged with 1.6 liters of dried heptane, 253 g of a kaolin/titania mixture (prepared as in Part A) and 5 ml of a 1.6 molar solution of triethylaluminum in hexane. The autoclave was closed and the mixture was stirred for 5 minutes under nitrogen, then ethylene was admitted. The polymerization was carried out during 3 hours and ten minutes at 60° under 145 psig ethylene pressure.

The product (502 g) isolated as a fine granular powder, after rinsing with methanol and drying, contained 45.5% by weight of clay and 5% of titania, or a total mineral content of 50.5%. It was readily compression-molded at 175° under 1000–1500 psi into bars that had the following physical properties: tensile strength, 3017 psi, elongation, 65.7%, modulus, 530,000 psi, and impact strength (Izod, 73° F), 14.7 ft lb/in of notch.

EXAMPLE 5

This example illustrates the use of $CrCl_3$ on a mixture of clay, ZnO and $TiO_2$.

Part A

A solution of 1.33 g of chromium (III) chloride hexahydrate in 1 liter of distilled water was used to prepare a slurry with a mixture of 950 g of kaolin (Engelhard Industries, "Satintone"-1), 25 g of titanium dioxide pigment (Du Pont R 966 TiPure) and 25 g of zinc oxide (New Jersey Zinc XX503). The slurry was mixed in a rod mill for 36 hours after which time the pH of the aqueous portion was 4.5–5.0. The solid was isolated by centrifuging, washed 3 times with acetone and dried for 48 hours at 200° in a stream of nitrogen.

Part B

A 1-gal autoclave was dried at 150° under nitrogen purge, cooled and charged under nitrogen purge with 1.6 liters of dried heptane, 2 ml of a 1.6 molar solution of triethylaluminum in hexane, 209.7 g of kaolin-titania-zinc oxide mixture (prepared as described in Part A) and, finally, an additional 3 ml of a 1.6 molar solution of triethylaluminum. The autoclave was closed and stirred for 5 minutes, then ethylene was admitted. The polymerization was carried out during 4 hours at 60° under 250 psig ethylene pressure.

The product (408 g) was isolated as a fine granular powder, after rinsing with methanol and drying. It comprised 48.8% clay, 1.3% zinc oxide and 1.3% titania for a total mineral content of 51.4% by weight. It was molded at 175° and 1500 psi into bars that had the following tensile properties: strength, 2921 psi, elongation, 112%, modulus, 405,000 psi, and an impact strength (Izod, 73° F) of 9.2 ft lb/in of notch.

EXAMPLE 6

This example shows the use of mica as the filler component.

Part A

A solution (20 ml) of fumaratochromium nitrate in isopropyl alcohol (1.1% Cr) was diluted to 400 ml with distilled water and the pH raised to 4.5 by addition of sodium bicarbonate. To this was added 300 g of waterground mica (Concord) and the resulting slurry was stirred briefly. The solid was collected on a filter, washed with acetone (300 ml), and then dried at 100°–150° for 5 hours and at 70°–80° for several days in a nitrogen stream.

Part B

A 1-gal autoclave was dried at 150° under nitrogen purge, cooled and charged with 1 liter of dried heptane, 55 g of mica (prepared as in Part A) and 5 ml of a 1.6 molar triethylaluminum solution. The autoclave was closed and ethylene was admitted. The polymerization was carried out at 60° for 4 hours and 65° for an additional 5 hours under 500–550 psig ethylene pressure.

The product (277 g) was isolated as a fine, white powder after rinsing with methanol and drying. The mica content was about 24%. Only about 23% of the polymer was extracted by boiling xylene after several days. A 0.1% weight volume solution in tetralin had an inherent viscosity of 6.58 at 125° indicating very high molecular weight polymer was formed.

The polyethylene/mica composite was compressionmolded into bars at 175° and 2000 psi that had the following physical properties: tensile strength, 2564 psi, elongation, 76%, modulus, 515,000 psi, and an impact strength (Izod, 73° F) of 4.6 ft lb/in of notch.

EXAMPLE 7

This example shows the use of wollastonite as the filler.

Part A

A slurry was prepared of 800 g of wollastonite ("Cabolite" F1, Cabot Corporation) in 1400 ml of distilled water containing 1 g of chromium (III) acetate monohydrate and 5 ml of isopropyl alcohol. The initial pH was 4, but gradually rose to 6.5 during 4 days as the slurry was mixed in a rod mill. The solid was isolated by filtration and dried in a stream of nitrogen at 170°.

Part B

A 1-gal autoclave was dried at 150° under nitrogen purge, cooled and charged, in order, with 1.5 liters of dried heptane, 2 ml of a 1.6 molar solution of triethylaluminum, 200 g of wollastonite prepared as in Part A and, finally, an additional 3 ml of a 1.6 molar solution of triethylaluminum. The autoclave was closed and the mixture was stirred for 10 minutes under nitrogen. The polymerization was then carried out at 65° for 38 hours under 350 psig ethylene pressure.

The product (276 g) was isolated as a fine, white powder after rinsing with methanol and drying. Ash analysis indicated it to contain 70.6% of the mineral. Bars, compression-molded at 175° and 2000–3000 psi, had the following properties: tensile strength, 2647 psi, elongation, 8.3%, modulus, 1,064,000 psi, and an impact strength (Izod, 73°F) of 1.4 ft lb/in of notch.

EXAMPLE 8

This example illustrates the use of a mixture of alumina trihydrate and pigmentary titania as the filler component.

Part A

A slurry was prepared comprising 980 g of alumina trihydrate (Alcoa, C33) and 20 g of titania pigment (Du Pont R 966 TiPure) in 1100 ml of distilled water containing 8 ml of methacrylatochromium chloride solution (Du Pont Volan L, 6% chromium (III) by weight) and 5 ml of 1% ammonium hydroxide. The initial pH of the mixture was 4.5 and gradually rose to 5 during 48 hours of mixing in a ball-mill with stones. The solid was isolated by centrifuging and washed with 400 ml of acetone, then dried in a stream of nitrogen at 150°–160° for 72 hours.

Part B

A 1-gal autoclave was dried at 150° under nitrogen purge, cooled and charged with 1.325 liters of dried cyclohexane and 3 ml of a 1.6 molar solution of triethylaluminum solution in hexane. Next, 240 g of alumina trihydrate and 4.9 g of titania pigment, prepared as in Part A, were made into a slurry in 750 ml of dried heptane containing 5 ml of a 1.6 molar solution of triethylaluminum in hexane and the whole mixture transferred to an autoclave. The autoclave was closed and the polymerization was carried out at 60° for about 15 hours under 200 psig ethylene pressure.

The product (369 g) was a fine, white granular powder, after rinsing with methanol and drying. It contained 65 weight percent of alumina trihydrate and 1.5% of titania pigment. Bars molded from this composite at 175° and 2000 psi pressure had the following physical properties: tensile strength, 2397 psi; elongation, 37.9%; modulus, 601,000 psi; and impact strength (Izod, 73°F), 3.7 ft lb/in of notch.

EXAMPLE 9

This example illustrates the use of silica as the filler.

Part A

Fumaratochromium nitrate (6 ml) solution (1.1% chromium (III)) in isopropyl alcohol was diluted with 24 ml of distilled water. Half of the resulting solution was further diluted with 270 ml of distilled water and mixed with 300 g of diatomaceous earth (silica, Johns Mansfield, "Filter Cell"). An additional 600 ml of distilled water was needed to get a stirrable slurry. The remaining half of the chromium (III) solution was next added with stirring and the pH was adjusted to ca. 6.5 by addition of 7 ml of 1M NaHCO$_3$ solution. The solid was collected on a filter, washed three times with acetone, then dried at 95°–150° for 15–20 hours in a stream of nitrogen.

Part B

A 1-gal autoclave was dried at 150° under nitrogen purge and charged under nitrogen purge with 1 liter of dried heptane, 88 g of diatomaceous earth, prepared as in Part A, and 6 ml of a 1.2 molar solution of diisobutylaluminum hydride solution in hexane. The autoclave was closed, stirring was started and the polymerization was carried out at 65° for 1 hour and 53 minutes under 500–550 psig ethylene pressure.

The product (210 g), isolated as a fine tan powder after methanol rinse and drying, contained 42% by weight of diatomaceous earth. It was compression-molded at 175° and 2000 psi into bars that had the following physical properties: Tensile strength, 2538 psi; elongation, 4%; modulus, 487,000; and an impact strength of 1.0 ft lb/in of notch (Izod, 73°F).

EXAMPLE 10

This example shows the use of a mixture of two different fillers modified by two different chromium compounds.

Part A

Fumaratochromium nitrate solution (30 ml, 0.1% Cr (II)) was diluted with distilled water to 240 ml and mixed with 600 g of alumina trihydrate (Alcoa C33) to form a slurry. Another 30 ml of the fumaratochromium nitrate solution was added to the slurry with stirring and the pH was adjusted to 5 by addition of 1 ml of 1 molar sodium bicarbonate solution. The slurry was filtered and the solid was washed three times with 450-ml portions of acetone and, finally, dried at 150° in a stream of nitrogen for 10 hours.

Part B

Kaolin clay (1000 g, "Harwick" GK soft) was made into a slurry with a solution of 1.24 g of chromium (III) acetate monohydrate in 1000 ml of distilled water and the slurry was tumbled with glass rods for 24 hours. The pH of the solution was between 4 and 4.5. The slurry was filtered and the filtrate was noted to be much lighter in color than the original solution. The solid was dried at 180°–190° in a stream of nitrogen for 5 days.

Part C

A 1-gal autoclave was dried at 150° under nitrogen purge and charged under nitrogen purge with 0.95 liter of dried cyclohexane and 2 ml of a 1.6 molar solution of triethylaluminum in hexane. Next was added a slurry of 95 g of alumina trihydrate containing superficially adsorbed chromium (III) (prepared as in Part A) and 84 g. of kaolin clay containing superficially adsorbed chromium (III) (prepared as in Part B) in 700 ml of heptane containing 3 ml of 1.6 molar solution of triethylaluminum. The autoclave was closed and the polymerization carried out at 60° for 3 hours at 200 psig ethylene pressure.

The product (335 g), isolated as a fine granular powder after rinsing with methanol and drying, contained 28.5 percent alumina trihydrate and 25 percent kaolin clay. It was compression-molded into bars at 175° and 1500 psi that had the following physical properties: tensile strength, 2344 psi; elongation, 239%; modulus, 473,000 psi; and impact strength (Izod, 73°F), 8.7 ft. lb/in of notch.

EXAMPLE 11

This example shows the preparation of a polyethylene/chromium-modified clay composite in the presence of hydrogen.

Part A — Preparation of Clay Catalyst

Ten ml of a fumaratochromium nitrate solution [1.1% Cr (III)] in isopropyl alcohol was diluted to 200 ml with distilled water and the pH of the resulting solution was adjusted to ca. 4, with sodium bicarbonate. A batch of 408 g of kaolin (ASP 400, Engelhard Industries) was added with stirring, followed by another 200 ml of the chromium complex solution prepared as before and the pH was adjsusted to 4.5.

The solid material was collected on a filter (the filtrate was nearly colorless in contrast to the highly colored blue-green solution originally used), washed once with 500 parts of acetone, which facilitates the drying step, and dried in a stream of nitrogen at 90°–120° for 14 hours.

Part B — Preparation of Clay/Polyethylene Composites

A 1-gal autoclave was dried at 150° under nitrogen, cooled and charged under nitrogen purge with 1000 ml of dried heptane, 139 g of kaolin, prepared as in Part A, and 7 ml of a 1.2 molar solution of diisobutylaluminum hydride. The autoclave was closed and pressured to 300 psig with hydrogen and then to a total of 400 psig with ethylene. The temperature was raised to 65° and the pressure held between 550 and 500 psig by repressuring with ethylene as needed. After 19 hours, the reaction was still proceeding and the total cumulative pressure drop within the controlled range was 800 psi.

The product (260 g) was isolated, washed with methanol and dried. It was a fine powder having a surface area of 4.81 $m^2/g$ and containing 53.5% kaolin. The polymer was extracted with boiling xylene. A 0.05 weight/volume solution of the polymer in 1,2,4-trichlorobenzene at 130°C. had an inherent viscosity of 2.58.

Test samples compression-molded from the powder at 150° and 400 psi had the following physical properties: tensile strength, 2400 psi; elongation, 15%; modulus, 610,000 psi; and impact strength (Izod, 73°F), 0.8 ft lb/in of notch. As is apparent from the earlier examples the chromium-mineral-catalyst is sensitive to chain transfer reactions with hydrogen and gives products of increased modulus, but lower elongation and impact strength, as compared with those obtained using similar catalysts in the absence of hydrogen.

EXAMPLE 12

This example shows the use of talc as the mineral filler.

Part A

A slurry was prepared of 1000 g of undried talc in 1250 ml of distilled water containing 5 ml of 1% $NH_4OH$ solution and 10 ml of methacrylatochromium chloride solution (Du Pont Volan L, 6% chromium (III)) To this slurry was added 100 ml of isopropyl alcohol. The pH of the slurry was 5.0 and remained constant during 24 hours of mixing of the slurry in a ball mill with stones. The slurry was separated from the stones and the solid was isolated by filtration, washed with about 500 ml of acetone and dried in air and then in a stream of nitrogen at 190°.

Part B

A 1-gal autoclave was dried at 150° under nitrogen purge, cooled, and charged with 1.3 l of dried heptane and 2 ml of a 1.6 molar solution of trimethylaluminum in hexane. Next, 194 g of talc, prepared as in Part A, was made into a slurry in 750 ml of dried heptane containing 5 ml of a 1.6 molar solution of trimethylaluminum in hexane and the whole transferred to the autoclave. The autoclave was closed and the polymerization was carried out at 55° for about 10 hours under 150 psig ethylene pressure.

The product (299.5 g) was a fine, white granular powder, after rinsing with methanol and drying. It contained 58.6% talc.

Bars molded from this composite at 175° and 2000 psi pressure had the following physical properties: tensile strength, 2644 psi; elongation, 150%; modulus, 631,500 psi; and impact strength (Izod, 0°F.), 3.5 ft lb/in of notch.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

The embodiments of the invention in which an exclusive property or privilege is claimed are defined as follows:

1. The method of preparing a moldable, essentially homogeneous, polyolefin/inorganic filler composition which comprises
   a. contacting particulate inorganic filler having a surface area of less than 100 m²/g and an average effective particle diameter of less than 50 μ with a solution of chromium (III) compound in a polar solvent selected from the group consisting of water and alcohols whereby the chromium compound is adsorbed onto the surface of the filler in the amount of 0.01 to 1% by weight of chromium, based on the filler;
   b. activating the chromium-modified filler by drying to remove the polar solvent at a temperature of 25° to 400°C;
   c. dispersing at least 1 weight/volume percent of the resulting chromium-modified filler as a slurry in an inert, liquid hydrocarbon;
   d. adding to the slurry 0.01 to 2% by weight, based on the filler, of organoaluminum compound selected from the group consisting of trialkylaluminums, dialkylaluminum hydrides, dialkylaluminum alkoxides, alkylaluminum halides and polymeric hydrocarbylaluminums in which the alkyl groups, alike or different, have 1 to 10 carbons each;
   e. polymerizing olefin selected from the group consisting of $(C_2-C_{10})$-1-alkenes and mixtures thereof in the presence of the slurry with agitation at a temperature of 0° to 250°C and a pressure from atmospheric to 500 atmospheres to form a polyolefin having an inherent viscosity of at least 2.5; and
   f. isolating the resulting polyolefin/filler composition as a free-flowing, essentially homogeneous powder.

2. The method of claim 1 in which the chromium (III) compound is selected from the group consisting of chromium nitrate, chromium halides, $C_1$ to $C_{12}$ esters of chromium, chromium sulfate, $[Cr(NH_3)_5Cl]Cl_2$, $[Cr(NH_3)_6]Cl_3$, hexaurea chromium (III) fluosilicate, fumaratochromium (III) nitrates, methacrylatochromium hydroxide, and methacrylatochromium chloride.

3. The method of claim 1 in which at least 5 weight/volume percent of particulate filler is dispersed in the hydrocarbon.

4. The method of claim 1 in which the polyolefin is polyethylene having an inherent viscosity of at least 4.

5. The method of claim wherein whereing the organoaluminum compound is trialkylaluminum.

6. The method of claim 5 wherein the hydrocarbon is heptane or cyclohexane.

* * * * *

UNITED STATES PATENT OFFICE
CERTIFICATE OF CORRECTION

PATENT NO. : 3,950,303
DATED : April 13, 1976
INVENTOR(S) : Robert DeWald Lipscomb It is certified that error appears in the above-identified patent and that said Letters Patent are hereby corrected as shown below:

Column 14, lines 61 and 62, "Johns Mansfield, "Filter Cell"" should read --Johns Manville, "Filter Cel"--.

Column 15, line 27, "(II))" should read --(III))--.

Signed and Sealed this

Fifth Day of October 1976

[SEAL]

Attest:

RUTH C. MASON
Attesting Officer

C. MARSHALL DANN
Commissioner of Patents and Trademarks